United States Patent
More

(10) Patent No.: US 10,134,076 B2
(45) Date of Patent: Nov. 20, 2018

(54) METHOD AND SYSTEM FOR ATTRIBUTE EXTRACTION FROM PRODUCT TITLES USING SEQUENCE LABELING ALGORITHMS

(71) Applicant: Wal-Mart Stores, Inc., Bentonville, AR (US)

(72) Inventor: Ajinkya More, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 507 days.

(21) Appl. No.: 14/752,564

(22) Filed: Jun. 26, 2015

(65) Prior Publication Data
US 2016/0379289 A1   Dec. 29, 2016

(51) Int. Cl.
- G06Q 30/00 (2012.01)
- G06Q 30/06 (2012.01)
- G06F 17/27 (2006.01)
- G06F 17/30 (2006.01)
- G06N 5/02 (2006.01)

(52) U.S. Cl.
CPC ....... *G06Q 30/0627* (2013.01); *G06F 17/277* (2013.01); *G06F 17/30345* (2013.01); *G06N 5/02* (2013.01); *G06Q 30/0643* (2013.01)

(58) Field of Classification Search
CPC ..................................................... G06F 17/277
USPC ........................................ 707/810; 705/26.63
See application file for complete search history.

(56) References Cited

U.S. PATENT DOCUMENTS

| | | | |
|---|---|---|---|
| 8,402,068 B2* | 3/2013 | Clendinning | G06Q 30/02 707/748 |
| 2006/0245641 A1* | 11/2006 | Viola | G06F 17/2715 382/155 |
| 2012/0278060 A1* | 11/2012 | Cancedda | G06F 17/2818 704/2 |

OTHER PUBLICATIONS

Vlichael Collins—AT&T Labs-Research; http://dl.acm.org/citation.cfm?id=1118694; "Discriminative Training Methods for Hidden Markov Models: Theory and Experiments with Perceptron Algorithms" pp. 1-8; Jul. 6, 2002, Association for Computational Linguistics, Stroudsburg, PA, USA.

(Continued)

*Primary Examiner* — Rokib Masud
(74) *Attorney, Agent, or Firm* — Bryan Cave Leighton Paisner LLP

(57) ABSTRACT

A system and method for attribute extraction from product titles is presented. A set of product titles are read by an embodiment. The product titles are separated into a sequence of tokens, the tokens being determined by the presence of a separator character. The sequences of tokens are labeled according to a specific encoding scheme to denote attributes of a title, such as brand name and other features. The characteristics of the attributes within the title are determined to build a sequence labeling algorithm. The results of the encoding is compared to a normalization dictionary comparing standardized attributes. A blacklist can be consulted to further refine the method. A further validation can be performed to catch any remaining mistakes. Thereafter, a database entry can be made to associate the attribute with the item. A training set can be used to initialize the learning model. Other embodiments are also disclosed herein.

16 Claims, 7 Drawing Sheets

(56) References Cited

OTHER PUBLICATIONS

Lafferty et al.; http://repository.upenn.edu/cis_papers/159; "Conditional Random Fields: Probabilistic Models for Segmenting and Labelling Sequence Data"; pp. 1-10; Jun. 28, 2001, Morgan Kaufmann Publishers Inc., San Francisco, CA, USA.

\* cited by examiner

```
Initialize w = (0, ..., 0)

Initialize wₐ = (0, ..., 0)

For j = 1 to N

For I = 1 to n $y_i^* = \arg\max_{y \in Y_s} w^T F(x_i, y_i)$

If $y_i \neq y_i^*$, then $w = w + F(x_i, y_i) - F(x_i, y_i^*)$ $w_a = w_a + w$

Return $\frac{w_a}{nN}$
```

FIG. 5

METHOD AND SYSTEM FOR ATTRIBUTE EXTRACTION FROM PRODUCT TITLES USING SEQUENCE LABELING ALGORITHMS

TECHNICAL FIELD

This disclosure relates generally to on-line retail sales and more particularly to a method and system for extracting attributes from product titles in an electronic commerce environment.

BACKGROUND

An electronic commerce ("eCommerce") provider will typically maintain a website and/or a mobile app that allows customers to search and browse through the eCommerce provider's goods and services. It can be desirable for the eCommerce provider to allow the user to search and filter items based on characteristics of the items. It can be desirable for the eCommerce provider to have an automated method of determining characteristics of the items it sells.

BRIEF DESCRIPTION OF THE DRAWINGS

To facilitate further description of the embodiments, the following drawings are provided in which:

FIG. 5 is pseudo code of an algorithm used in an embodiment;

Figure 1:
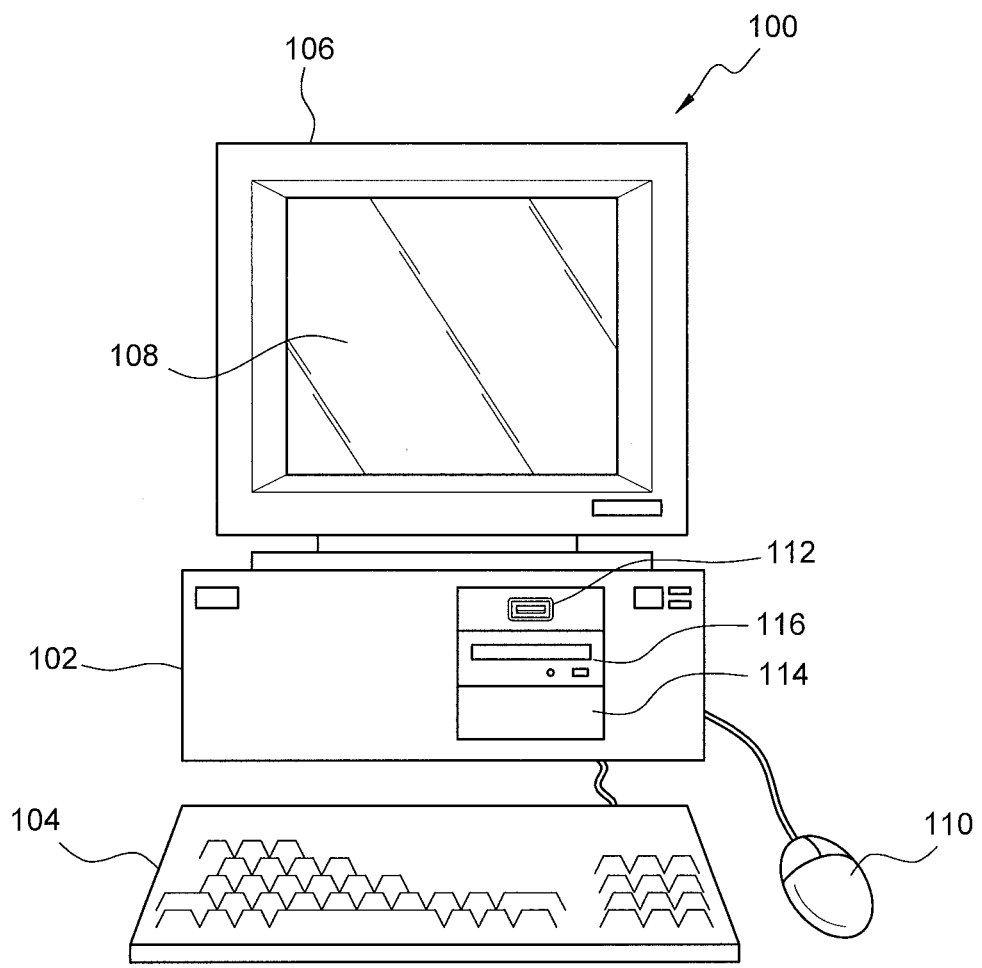
FIG. 1 illustrates a front elevation view of a computer system that is suitable for implementing an embodiment of the system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In one embodiment, a system might comprise: one or more input devices; a display; one or more processing modules; and one or more non-transitory storage modules storing computing instructions configured to run on the one or more processing modules and perform the acts of: receiving a title for a product; dividing the title into a sequence of tokens; encoding each token of the sequence of tokens to indicate a label for each token, each token having an associated label; determining a type of each token of the sequence of tokens based on the label associated with each token of the sequence of tokens; determining an attribute from each token of the sequence of tokens using the label for each token of the sequence of tokens; normalizing the attributes to create standardized representations of the attributes; writing the attributes to database entries associated with the product; and facilitating a representation of the attributes on the display.

In one embodiment, a method might comprise: receiving a title for a product; dividing the title into a sequence of tokens; encoding each token of the sequence of tokens to indicate a label for each token, each token having an associated label; determining a type of each token of the sequence of tokens based on the label associated with each token of the sequence of tokens; determining an attribute from each token of the sequence of tokens using the label for each token of the sequence of tokens; normalizing the attribute to create standardized representations of the attributes; writing the attributes to database entries associated with the product; and facilitating a presentation of the attributes on a display.

Figure 2:
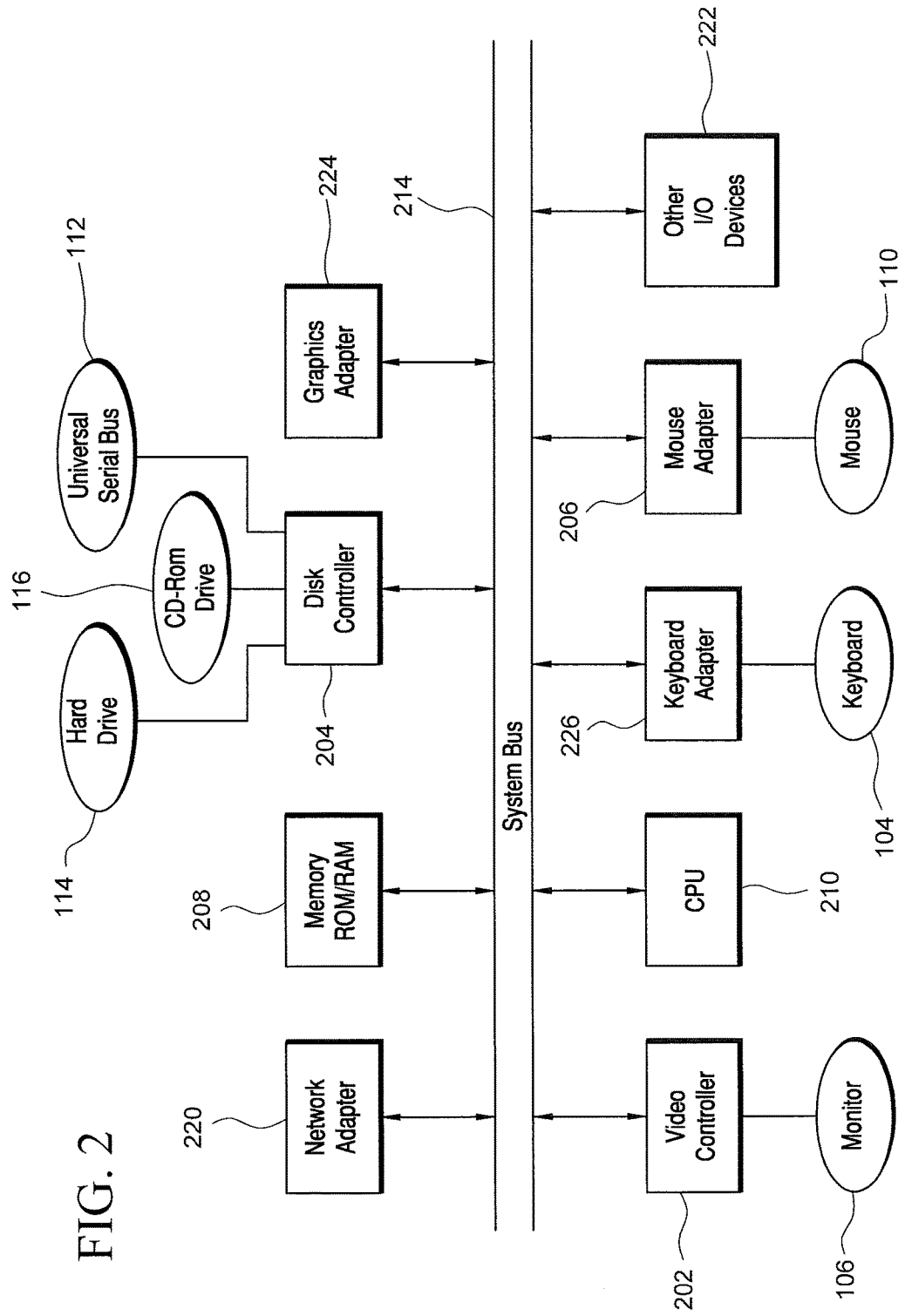
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) also can be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM, DVD drive, or Blu-ray drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® operating system (OS), Apple® OS X, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
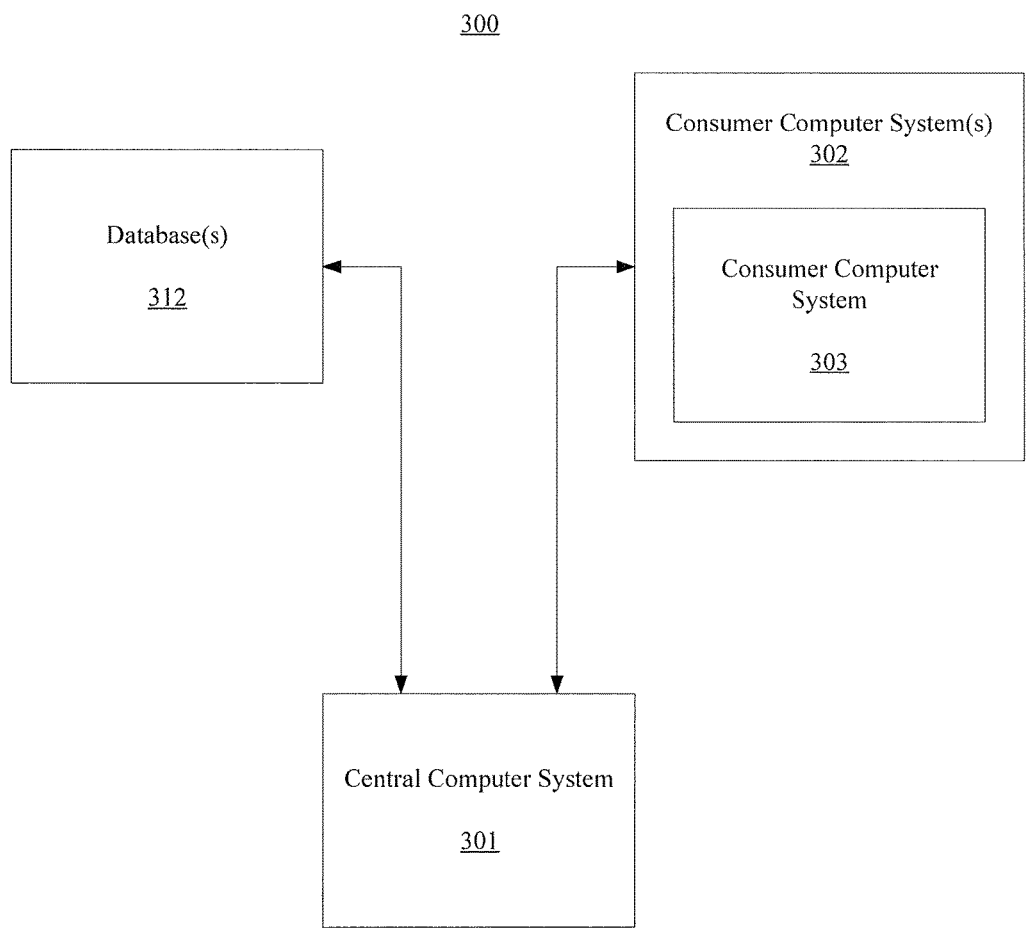
FIG. 3 is a representative block diagram of a system according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more predetermined acts performed by the consumer; and reactive acts can refer to acts (e.g., identification, determination, communication, etc.) performed with consideration of (i.e., in response to) one or more predetermined acts performed by the consumer. For example, in some embodiments, the predetermined act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touchscreen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, consumer computer system(s) 302 each can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile devices, etc. At least part of central computer system 301 can be located remotely from consumer computer system(s) 302.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™ and Windows 10 (mobile)™ operating systems by Microsoft Corporation of Redmond, Wash., United States of America, or (vi) the Symbian™ operating system by Nokia Corp. of Keilaniemi, Espoo, Finland.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312 or it can be spread across multiple of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, and the like. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer. But in many embodiments, the functionality of system 300 can be extended to each of consumer computer system(s) 302 and/or to multiple consumers. In these extended examples, in some embodiments, single consumers can interface (e.g., interact) with central computer system 301 with multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile device), such as, for example, when interfacing with central computer system 301 away from home.

Electronic commerce (eCommerce) is a steadily growing portion of the retail sector. In 2014, eCommerce sales were over $300 billion. eCommerce sales have been growing with over ten percent growth rate each year for over a decade. As more and more products become available for sale to users over the Internet, the desire to manage the number of choices available to consumers becomes greater. In addition, as eCommerce sales continues to grow, there is a desire among eCommerce retailers to distinguish themselves from their competitors by providing a better experience for customers.

eCommerce sites typically provide a number of different methods by which a customer can find products. One method involves using search boxes, in which a user can enter search terms to find products for which they want additional information. Another method involves the use of filters.

A filter allows a customer to limit search results based on various attribute values.

An attribute is a feature of a product that describes a certain property of the product. Some examples of attributes can include brand, color, gender, material, title, description, and the like. An exemplary usage of a filter is in a navigation pane, such as one on the side of a browser page.

The manner in which a customer would use a filter is as follows. The customer is either browsing through a category, or enters a search term, for example, "running shoe." Exemplary running shoes will be displayed to a user, typically in the center portion of a browser page or mobile app. A navigation pane can be displayed to the customer (typically on the left side of the screen in a browser implementation) showing some exemplary attributes. The customer can select various attributes. Thereafter, the products displayed to a customer will be limited to those that satisfy the selected attribute.

If the selected attribute was the color red, then the only products shown to the user would be those that have a red attribute flagged. If the selected attribute were a brand, only the products of that brand will be shown to the customer. The customer can limit the selections by price, color, size, and many other different attributes, depending on the type of item (e.g., color might not be applicable to food products, for example).

Another use for attributes is ad campaigns (also known as "product listing advertisements".) An exemplary ad campaign utilizes search terms in a search engine (such as Google or Bing). When a user types in "Nike running shoe" in a search engine, there can be a sponsored ad featuring the eCommerce provider's link to various Nike running shoes. However, in order to run such an ad campaign, the eCommerce provider must be able to determine which products it has available that satisfy the search request. The accurate pairing of attributes with products also can be used to match newly added products with products that already exist in the eCommerce provider's database. There also can be regulations (either internal of the eCommerce provider or by a governmental entity) that requires certain attributes to be tracked (for example, unit pricing). It would be desirable to have a method for automatically populating various fields of various databases such that filtering can be used by the customers.

The problems encountered by missing attributes can be seen readily. For example, there can be a shirt made by company Z available in a variety of different colors. However, if the color attribute is not stored for that shirt, when a customer tries to filter a search request by color, those shirts do not show up, resulting in a potential missed sale by the eCommerce provider and a potential unhappy customer. Tests have shown a significant increase in impressions and clicks of items after attribute values have been added to the items.

A possible problem encountered by eCommerce providers is that the eCommerce provider must retrieve the attributes from a database accessible by the eCommerce provider. The database must be populated in some manner. The products being sold by the eCommerce provider might have a variety of different sources. The sources of the products typically might not provide entries for each potential data base entry for each product. Indeed, because different eCommerce providers might use different terminology and different database layouts, it might not be possible for a supplier to provide entries for each possible attribute in a database. In addition, some eCommerce providers allow third-parties to sell products using their site. In such a manner, the third-party might be tasked with populating the database entries that contain attributes that can be used for filtering.

An embodiment can operate by parsing the title of a product to determine various attributes about the product. For example, an eCommerce retailer may receive information about a product including the title. An exemplary title might be as follows: "Hewlett-Packard Smart Buy Pro Desktop 3.20 g 8 GB 500 GB." From this title, various attribute fields can be completed such as brand ("Hewlett-Packard"), amount of RAM ("8 GB"), and the hard drive space of the computer ("500 GB").

Thereafter, when a customer is browsing a website of the eCommerce provider, the customer can utilize filtering techniques to find the product he wants. Exemplary filtering techniques can include filtering search results by brand name, by amount of RAM, or by the size of hard drive. If the user wants a computer that has at least 800 Gigabytes (GB) of hard drive space, this particular entry will not be shown to the user. But the if user wants a computer that has at least 400 GB of hard drive space, this computer will be shown to the user after the user selects the appropriate filter(s).

There are various problems that must be addressed when analyzing product titles to find attributes. For example, some products do not have a brand in the title. So it cannot be assumed that the title will always contain a brand. In addition, product titles can contain acronyms, and the acronyms might not be consistently applied. In the example described above, there are two figures for GB, "8 GB," and "500 GB." An automated procedure must determine that one figure is for RAM and one figure is for a hard drive. In addition, some titles might not have a space between the number and the "GB." Other products might not have a space (e.g., "8 GB"). Some titles might have capitalization and others might not. (e.g., GHz vs ghz). Some titles may abbreviate units of measurement, other titles may abbreviate units of measurement in a different manner (e.g., 21" vs. 21 inches vs. 21 in.) Titles from one manufacturer can have a different structure than titles from another manufacturer. For example, a shirt from one manufacturer might have the color before the size while a different manufacturer might have the size listed before the color (e.g., "blue small shirt" vs "small blue shirt"). Other shirts might use abbreviations for sizes and others might not (e.g., "XL" vs "extra large"). Brand names may be expressed in different manners also (e.g., "Proctor and Gamble" vs. "Proctor & Gamble" vs. "Proctor&Gamble" vs. "P&G"). In addition, the brands being sold by an eCommerce retailer are not necessarily constant. An eCommerce retailer might begin selling a brand it had not previously sold before, or a new company might be in existence to sell a new type of product. It would be desirable to be able to detect and discover new brand names as well as extract known brand names with high precision and in a non-manual or automated manner.

Figure 4:
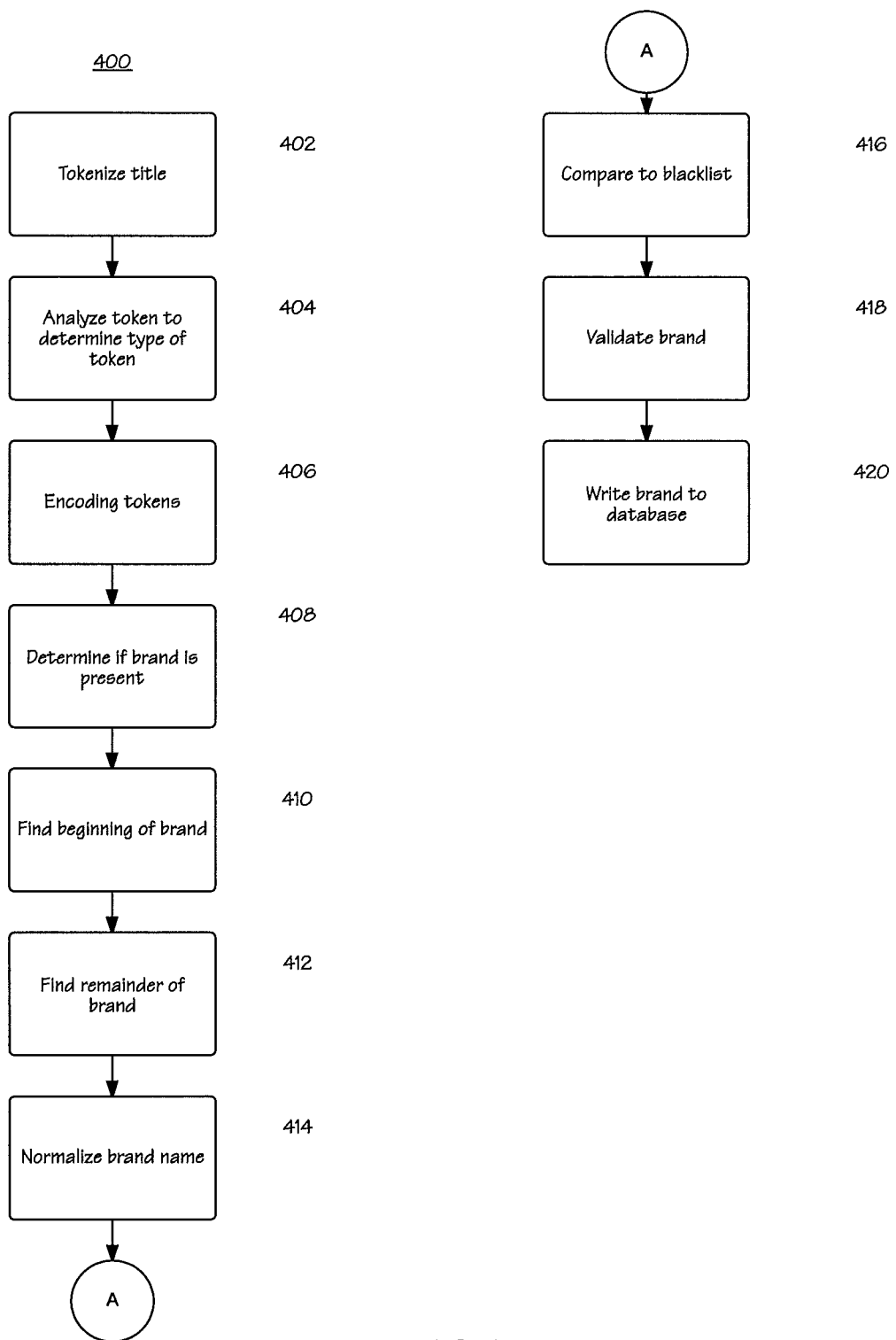
FIG. 4 is a flowchart illustrating the operation of an embodiment.

FIG. 4 shows a flowchart illustrating the operation of a method 400 of determining a brand from a title. Method 400 is merely exemplary and is not limited to the embodiments presented herein. Method 400 can be employed in many different embodiments or examples not specifically depicted or described herein. In some embodiments, the procedures, the processes and/or the activities of method 400 can be performed in the order presented. In other embodiments, the procedures, the processes, and/or the activities of method 400 can be performed in any other suitable order. In still other embodiments, one or more of the procedures, the processes, and/or the activities of method 400 can be combined or skipped. In some embodiments, method 400 can be implemented by computer system 100 (FIG. 1).

An exemplary embodiment uses a sequence labeling algorithm to parse product titles to extract the brand attribute. It should be understood that a similar algorithm can be used to extract other attributes from the product title (such as color, size, and the like). After receiving the title, the title is divided into a sequence of tokens (block 402). These tokens can be determined by finding white-space in the title. For example, the title "Trademark Global 24 inch cushioned folding stool" can be separated into 7 different tokens, "Trademark," "Global," "24," "inch," "cushioned," "folding," and "stool."

The tokenization can take place in a variety of different manners, both those already known in the art and those developed in the future. For example, each character in the title can be examined and compared to a delimiter character.

In an embodiment using space delimiters, when a space character is detected, the previous characters are deemed to be one token, and the character after the space is the beginning of the subsequent token. Other delimiters can be used. This process can be iteratively performed for each character in the entire title, resulting in a set of tokens. Other information can be stored along with the token, such as an indication of the token's place within the title (e.g., $1^{st}$ token, $2^{nd}$ token, and the like).

The tokens are analyzed to determine which type of token it is (block 404). In an embodiment used to determine the brand name, this block can comprise determining if a token comprises the brand name of the item. The details of making this determination are presented in further detail below. It should be understood that, although this embodiment is discussed in conjunction with determining the brand of an item, other embodiments can determine other attributes of an item, such as screen size, amount of memory, color, and the like.

These tokens are encoded to associate each token in the series of tokens with a label (block 406). In some embodiments, the encoding might be through the use of a BIO encoding scheme, The encoding can be performed using one of a variety of different sequence labeling algorithms. Exemplary sequence labeling algorithms will be detailed below. A variety of different encoding schemes can be used. A BIO encoding scheme assigns a label to each token: B-brand, I-brand, or O-label. B-brand indicates the beginning of the brand name, and I-brand indicates an intermediate token (in other words, not the first token) of a brand name. O-label stands for "other," meaning the token is not part of the brand name (in other words, the token is a part of a description portion of a title.) The difference between B-brand and I-brand can be determined during a training stage, explained in further detail below. For the exemplary title discussed above, "Trademark Global 24 inch cushioned folding stool," the token "Trademark" is labeled as a B-brand, the token "Global" is labeled as I-brand, and each of the remaining tokens is labeled as "O-label."

Thereafter, the encoded tokens are processed to determine a brand name. If the label of all tokens of a product is O-label, then it can be concluded that a brand name does not appear for that particular product, and the output label is "unbranded" (block 408). Otherwise, contiguous sub-sequences of tokens are analyzed to determine the brand name. A token with a B-brand label is located (block 410) and noted as the beginning of the brand name. Each subsequent token of the sequence of tokens with an I-brand label is then concatenated with the brand name (block 412). This concatenating ends either at the last token of the item or when a token associated with an "O-label" is found.

After each token of the sequence of tokens is processed, any token that represents a brand name is normalized to create a standardized representation of a brand-name (block 414). Here, various permutations of brand-name token sequences are stored in a normalization dictionary. Any token or token sequence that is in the normalization dictionary is assigned the normalized name.

In an embodiment using a key-value store type of database, the normalization dictionary might contain a key-value pair where the key is a brand-name variation and the value is the normalized brand name. Referenced above was a hypothetical product manufactured by Hewlett-Packard. Various ways of referring to the brand can be included in the normalization dictionary, followed by the normalized brand name. For example, the following key-value entries might exist:

{'HewlettPackard', 'Hewlett-Packard'}
{'HP', 'Hewlett-Packard'}
{'Hewlettpackard', 'Hewlett-Packard'}
{'H-P', 'Hewlett-Packard'}
{'Hewlett Packard', 'Hewlett-Packard'}

Other variations of the name can also be present, along with capitalization variations. Any token with a value equal to one of those listed first in the key-value pairs listed above is replaced with the normalized token that is listed second in the pairs listed above. It should be understood that further variations can occur and might also be included in the normalization dictionary. Other variations can include capitalization variations and space variations.

Thereafter, the normalized tokens can be compared to a blacklist (block 416). A blacklist contains a list of terms that are known not to be brand names. A blacklist might contain terms that were processed and considered to be a brand name. The blacklist prevents further iterations of an embodiment from making the same erroneous determination.

Thereafter, a validation can be performed (block 418). A validation examines a term that is labeled as a brand but do not have a corresponding entry in a normalization dictionary. In other words, these tokens had never been previously found to be a brand. (In some embodiments, brand tokens that have an entry in a normalization dictionary are assumed to contain an actual brand name.) The validation can be performed manually or can be performed by an embodiment. After a run of an embodiment has been performed, tokens or token sequences that are predicted to be brand names are examined to determine if the tokens are actually brand names. If it is confirmed that the predicted brand name is accurate, the prediction is added to the normalization dictionary. Otherwise, the prediction is added to the blacklist. The confirmed and normalized brand name can be added to a database entry associated with the item (block 420).

The process of assigning a label to each token in a sequence can be termed "sequence labeling." For example, as described above, sequence labeling can refer to assigning the labels "B-brand", "I-brand", and "O-labels" to each token in a sequence (such as a title). An input sequence X can comprise multiple tokens $x_1, \ldots, x_m$. A label sequence Y can comprise multiple elements $y_1, \ldots, y_m$. Each token $x_j$ has an associated label $y_j$.

A feature function can be defined in a variety of different manners. For example, given an input X, one can tokenize X and associate each token X with a label Y. If the input phrase is "The quick brown fox jumps over the lazy dog," then the tokenized version is X={The, quick, brown, fox, jumps, over, the, lazy, dog}. Each token in X is associated with a label Y. Y can be an arbitrary labeling scheme where Y defines the part of speech (DT=determiner, JJ=adjective, NN=noun, VB=verb, IN=preposition) of each word in X. Thus, given X (above), Y would equal {DT, JJ, JJ, NN, VB, IN, DT, JJ, NN}.

A feature function can be defined as follows:

$$f(x, y, i) = \begin{cases} 1 & \text{if } x_i = \text{the and } y_i = DT \\ 0 & \text{otherwise} \end{cases}$$

This feature function only returns a 1 for the $7^{th}$ xy pair and a zero for all other XY pairs. Thus $f(x, y, 2)=0$ and $f(x, y, 7)=1$.

In some embodiments, there are d feature functions $f_1, \ldots, f_d$. Define $F_i$, a d-dimensional vector corresponding to the pair x, y, and position i, as follows:

$$F_i = (f_1(x,y,i), \ldots, f_d(x,y,i))$$

Therefore, $$F(x,y) = \sum_{i=1}^{m} F_i(x,y)$$

is a d-dimensional feature vector corresponding to the pair x, y.

Various different feature functions can be used. In some embodiments, a set of feature functions is selected, then tested to determine how effective the feature functions are. The selected set of feature functions can be tested by inputting all feature functions, then selectively turning off each feature to determine the effect each feature had on the precision of the analysis. In the end, the final set of feature functions is chosen such that removing any feature function would adversely affect the results. The resulting final set of feature functions represent characteristics of titles that can be indicative of an attribute, such as a brand name contained in a title.

The following is a list of feature functions that can be used in an embodiment that can be used to determine a brand name from a title:

A. Characteristic features:
1) The identity of the token;
2) The composition of the token (all numbers, alphanumeric, the presence of punctuation;
3) The case of the token (initial capitalization, all-caps, etc.);
4) Character n-gram suffixes and prefixes of the token; and
5) Number of characters in the token.

B. Locational features. These features are a function of the position of the token in the sequence of tokens into which the title is decomposed. These feature can include the following:
1) number of tokens in the title before the given token; and
2) number of tokens in the title after the given token.

C. Contextual features of tokens neighboring a given token. The features can include the following:
1) the preceding token;
2) the succeeding token;
3) the capitalization of the preceding/succeeding token;
4) whether both the token and the preceding token are capitalized;
5) whether both the token and the succeeding token are capitalized;
6) the bigram consisting of the token and the predecessor token;
7) the bigram consisting of the token and the succeeding token;
8) the bigrams consisting of the preceding two tokens and the successive two tokens;
9) whether the preceding/succeeding token are numeric;
10) whether the preceding token is contained in set: {"and", "&", "by", "of"}; and
11) part of speech tag for the token.

D. Lexical membership. Here, each token can be checked to see if it already exists in a database containing brand names.

Figure 6:
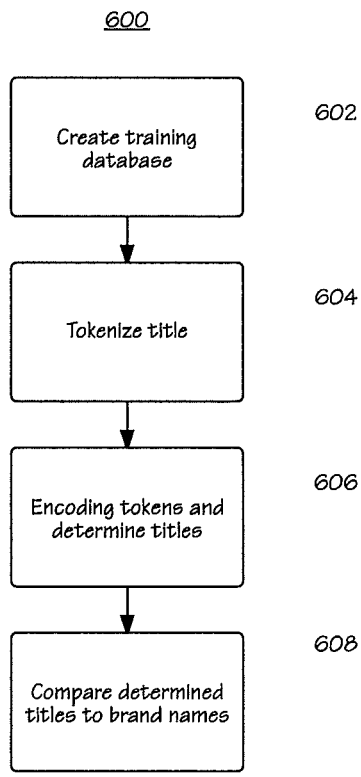
FIG. 6 is a flowchart illustrating the operation of an embodiment.

FIG. 6 shows a flowchart illustrating the operation of a method 600 of learning by using a training set. Method 600 is merely exemplary and is not limited to the embodiments presented herein. Method 600 can be employed in many different embodiments or examples not specifically depicted or described herein. In some embodiments, the procedures, the processes and/or the activities of method 600 can be performed in the order presented. In other embodiments, the procedures, the processes, and/or the activities of method 600 can be performed in any other suitable order. In still other embodiments, one or more of the procedures, the processes, and/or the activities of method 600 can be combined or skipped. In some embodiments, method 600 can be implemented by computer system 100 (FIG. 1).

In some embodiments, an algorithm such as that presented in method 400 will first be performed on a training database, which can be a set of titles with known brand information. Because method 400 is a learning algorithm, after method 400 has been performed on a training database, the results (the annotated tokens) can be compared to the tokens with the correct annotation. Method 400 learns which feature functions are typically present in brand names, such as the position of the token in the title, contextual features (e.g., consecutive tokens or the presence of conjunctions), parts of speech, capitalization, and the like. In addition, the normalization dictionary can be filled and validated such that method 400 can be subsequently used on a set of titles. In other embodiments, the normalization dictionary can be partially pre-filled using a set of standardized brand names with which extracted brand names can be compared.

A training database can be created (block 602). The entries in the training database can include a title and a brand. The title is divided into a series of tokens, using a technique such as described above (block 604). The tokenized titles are then encoded using the BIO scheme, and the titles are determined as described above (block 606). The tokenized titles are then compared to known brand names (block 608). This comparison can include analyzing the titles and the feature functions to determine characteristics of titles within feature functions. The feature functions can include those feature functions described above.

While methods 400 and 600 were described with respect to extracting brand names from titles, the techniques of method 400 can be used to extract other attributes from titles. Embodiments have been used to extract character names from titles (e.g., the character "Winnie the Pooh" from the product title "Disney Winnie the Pooh Feeder Bibs") and attributes of electronic devices. For example, computers can be classified as to the amount of RAM, the hard drive space, or the screen size (of a monitor). The learning functions can learn how much RAM is typical in a computer and how much hard drive space is typical in a computer and can normalize units used to describe them (e.g, 1000 GB vs. 1 TB).

A variety of different algorithms can be used to assign labels to tokens. One type of algorithm that can be used for this process are sequence labeling algorithms. Sequence labeling can be treated as a set of independent classification tasks. In other words, each token can be assigned a label without regard to other tokens. However, the accuracy of such a process might be improved by making the label of a token dependent on the choices of nearby tokens. Thus, a special algorithm can be used to choose the globally best set of labels for the entire sequence of tokens at once.

One such algorithm that can be used is the structured perceptron learning algorithm. Assume a number of feature functions equal to d. A training set to the algorithm uses a set of labeled sequences $\{(x_i, y_i)\}$, where i=1, ..., n. Each input $x_i$ is a sequence of the form:

$(x_1, \ldots, x_m)_i$

With a corresponding sequence of labels:

$(y_1, \ldots, y_m)_i$

Such that the input sequence element $x_j$ has a corresponding element $y_j$. The labels belong to a finite set $Y_L$. Let Ys denote the set of all sequences of length m such that each entry in the sequence belongs to $Y_L$. Thus, $|Y_S|=|Y_L|^m$. As an example, the algorithm presented in FIG. 5 can be performed to accomplish this task.

FIG. 5 presents pseudo code illustrating the steps of an exemplary structured perceptron algorithm. A weight vector is initialized to zero. Then a variety of iterations are performed. For each iteration, a predicted value of y is determined. This prediction can be performed using Vitterbi decoding or any similar type of algorithm. Once the iterations are completed, the weight for the feature functions is determined. In such a manner, the supervised learning algorithm can determine how much weight to give each feature function.

While the above described embodiment uses a structured perceptron algorithm to perform a sequence labeling algorithm, other sequence labeling algorithms or supervised learning algorithms also can be used. Exemplary sequence labeling algorithms can include the conditional random fields algorithm.

Figure 7:
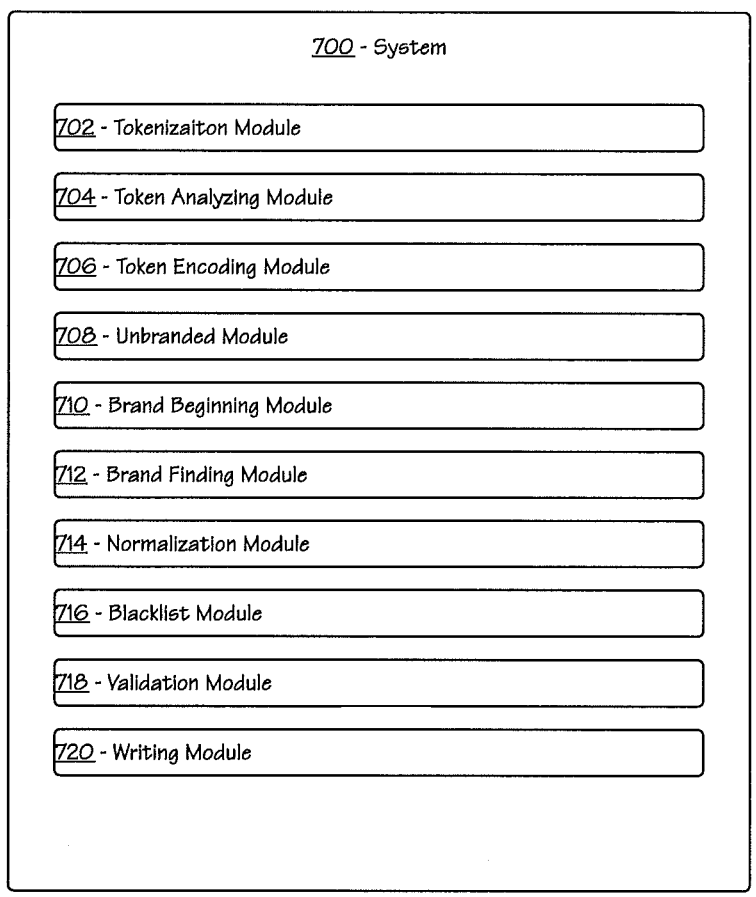
FIG. 7 is block diagram of a system capable of performing embodiments.

Turning ahead in the figures, FIG. 7 illustrates a block diagram of a system 700 that is capable of performing disclosed embodiments. System 700 is merely exemplary and is not limited to the embodiments presented herein. System 700 can be employed in many different embodiments or examples not specifically depicted or described herein. In some embodiments, certain elements or modules of system 700 can perform various procedures, processes, and/or acts. In other embodiments, the procedures, processes, and/or acts can be performed by other suitable elements or modules.

In a number of embodiments, system 700 can include tokenization module 702. In certain embodiments, tokenization module 702 can perform block 402 (FIG. 4) of dividing a title into a series of tokens.

In a number of embodiments, system 700 can include token analyzing module 704. In certain embodiments, token analyzing module 704 can perform block 404 (FIG. 4) of analyzing tokens.

In a number of embodiments, system 700 can include token encoding module 706. In certain embodiments, token encoding module 706 can perform block 406 (FIG. 4) of encoding tokens using an encoding scheme.

In a number of embodiments, system 700 can include unbranded module 708. In certain embodiments, unbranded module 708 can perform block 408 (FIG. 4) of determining if a title has a brand.

In a number of embodiments, system 700 can include brand beginning module 710. In certain embodiments, brand beginning module 710 can perform block 410 (FIG. 4) of finding the beginning of the brand.

In a number of embodiments, system 700 can include brand finding module 712. In certain embodiments, brand finding module 712 can perform block 412 (FIG. 4) of finding the rest of the brand name.

In a number of embodiments, system 700 can include normalization module 714. In certain embodiments, normalization module 714 can perform block 414 (FIG. 4) of normalizing a brand name.

In a number of embodiments, system 700 can include blacklist module 716. In certain embodiments, blacklist module 716 can perform block 416 (FIG. 4) of determining if a brand is located in a blacklist.

In a number of embodiments, system 700 can include validation module 718. In certain embodiments, validation module 718 can perform block 418 (FIG. 4) of validating a brand.

In a number of embodiments, system 700 can include writing module 720. In certain embodiments, writing module 720 can perform block 420 (FIG. 4) of writing a title to a database.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 can be modified, and that the foregoing discussion of certain of these embodiments does not necessarily represent a complete description of all possible embodiments. For example, one or more of the procedures, processes, or activities of FIGS. 1-7 can include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more input devices;
   a display;
   one or more computer processing modules; and
   one or more non-transitory storage modules storing computing instructions configured to run on the one or more computer processing modules and perform acts of:
   receiving, from a third-party electronic device at the one or more computer processing modules, a title for a product;
   dividing, at the one or more computer processing modules, the title into a sequence of tokens;
   storing, by the one or more computer processing modules onto the one or more non-transitory storage modules, the sequence of tokens;
   determining, at the one or more computer processing modules, a type of each token of the sequence of tokens using machine learning algorithms comprising a sequence labeling model, wherein the sequence labeling model comprises a set of feature functions, each of the set of feature functions comprising:

$$f(x, y, i) = \begin{cases} 1 & \text{if } x_i = \text{the and } y_i = DT \\ 0 & \text{otherwise} \end{cases}$$

wherein each x consists of a different token of the sequence of tokens, each y consists of a first type of label for each token of the sequence of tokens, and DT is a first label assigned to a determiner;
   storing, by the one or more computer processing modules onto the one or more non-transitory storage modules, the type of each token of the sequence of tokens;
   encoding, at the one or more computer processing modules, each token of the sequence of tokens to indicate a second type of label for each token of the sequence of tokens, wherein the second type of label for each token of the sequence of tokens is based on the type of each token of the sequence of tokens and is chosen from a BIO encoding scheme, wherein a label B of the BIO encoding scheme indicates a first token of a brand name, a label I of the BIO encoding scheme indicates a subsequent token of the brand name, and a label O of the BIO encoding scheme indicates a token that is not part of the brand name;
   storing, by the one or more computer processing modules onto the one or more non-transitory storage modules, the second type of label for each token of the sequence of tokens;
   determining, at the one or more computer processing modules, an attribute for each token of the sequence of tokens, the attribute comprising the brand name from each token of the sequence of tokens using a label for each token of the sequence of tokens;
   storing, by the one or more computer processing modules onto the one or more non-transitory storage modules, the attribute for each token of the sequence of tokens;
   normalizing, at the one or more computer processing modules, the attribute for each token of the sequence of tokens to create standardized representations of the attribute for each token of the sequence of tokens;
   writing, by the one or more computer processing modules onto the one or more non-transitory storage modules, the attribute for each token of the sequence of tokens to empty database entries associated with the product; and
   facilitating a representation of the attribute for each token of the sequence of tokens on a user display in response to a search request from a user.

2. The system of claim 1, wherein the computing instructions are further configured to perform acts of:
   storing the first token of the sequence of tokens associated with the label B of the BIO encoding scheme as a beginning of a brand name token; and
   concatenating to the brand name token each subsequent token of the sequence of tokens that is associated with the label I of the BIO encoding scheme.

3. The system of claim 2, wherein normalizing the attribute for each token of the sequence of tokens to create the standardized representations of the attribute for each token of the sequence of tokens comprises:
   comparing the brand name token with a normalization dictionary to determine a standardized representation of the brand name, wherein the standardized representations comprise the standardized representation; and
   writing the standardized representation of the brand name to a database entry associated with the product.

4. The system of claim 3, wherein the computing instructions are further configured to perform acts of:

gathering each unique standardized representation of the brand name;
determining a correctness of each unique standardized representation of the brand name; and
when the standardized representation of the brand name is not correct, creating an entry in the normalization dictionary to reflect a correct standardized representation of the brand name.

5. The system of claim 2, wherein the computing instructions are further configured to perform acts of:
comparing the brand name token to a blacklist database; and
changing a label of the first token when the brand name token is part of the blacklist database; wherein:
the blacklist database comprises tokens that have been determined to not be the brand name.

6. The system of claim 1, wherein:
receiving the title for the product further comprises receiving the title from a training set of titles; and
the computing instructions are further configured to perform an act of:
creating the training set of titles, wherein the training set of titles comprises titles with identified brand names.

7. The system of claim 1, wherein:
the sequence labeling model is chosen from a structured perceptron algorithm or a conditional random fields algorithm.

8. The system of claim 1, wherein:
normalizing the attribute for each token of the sequence of tokens to create the standardized representations of the attribute for each token of the sequence of tokens further comprises:
comparing the brand name token with a normalization dictionary to determine a standardized representation of the brand name, wherein the standardized representations comprise the standardized representation; and
writing the standardized representation of the brand name to a database entry associated with the product; and
the computing instructions are further configured to perform acts of:
storing the first token of the sequence of tokens associated with the label B of the BIO encoding scheme as a beginning of a brand name token;
concatenating to the brand name token each subsequent token of the sequence of tokens that is associated with the label I of the BIO encoding scheme;
gathering each unique standardized representation of the brand name;
determining a correctness of each unique standardized representation of the brand name; and
when the standardized representation of the brand name is not correct, creating an entry in the normalization dictionary to reflect a correct standardized representation of the brand name.

9. A method comprising:
receiving, from a third-party electronic device at one or more computer processing modules, a title for a product;
dividing, at the one or more computer processing modules, the title into a sequence of tokens;
storing, by the one or more computer processing modules onto one or more non-transitory storage modules, the sequence of tokens;
determining, at the one or more computer processing modules, a type of each token of the sequence of tokens using machine learning algorithms comprising a sequence labeling model, wherein the sequence labeling model comprises a set of feature functions, each of the set of feature functions comprising:

$$f(x, y, i) = \begin{cases} 1 \text{ if } x_i = \text{the and } y_i = DT \\ 0 \text{ otherwise} \end{cases}$$

wherein each x consists of a different token of the sequence of tokens, each y consists of a first type of label for each token of the sequence of tokens, and DT is a first label assigned to a determiner;
storing, by the one or more computer processing modules onto the one or more non-transitory storage modules, the type of each token of the sequence of tokens;
encoding, at the one or more computer processing modules, each token of the sequence of tokens to indicate a second type of label for each token of the sequence of tokens, wherein the second type of label for each token of the sequence of tokens is based on the type of each token of the sequence of tokens and is chosen from a BIO encoding scheme, wherein a label B of the BIO encoding scheme indicates a first token of a brand name, a label I of the BIO encoding scheme indicates a subsequent token of the brand name, and a label O of the BIO encoding scheme indicates a token that is not part of the brand name;
storing, by the one or more computer processing modules onto the one or more non-transitory storage modules, the second type of label for each token of the sequence of tokens;
determining, at the one or more computer processing modules, an attribute for each token of the sequence of tokens, the attribute comprising the brand name from each token of the sequence of tokens using a label for each token of the sequence of tokens;
normalizing, at the one or more computer processing modules, the attribute for each token of the sequence of tokens to create standardized representations of the attribute for each token of the sequence of tokens;
writing, by the one or more computer processing modules onto the one or more non-transitory storage modules, the attribute for each token of the sequence of tokens to empty database entries associated with the product; and
facilitating a representation of the attribute for each token of the sequence of tokens on a user display in response to a search request from a user.

10. The method of claim 9 further comprising:
storing the first token of the sequence of tokens associated with the label B of the BIO encoding scheme as a beginning of a brand name token; and
concatenating to the brand name token each subsequent token of the sequence of tokens that is associated with the label I of the BIO encoding scheme.

11. The method of claim 10 wherein normalizing the attribute for each token of the sequence of tokens to create the standardized representations of the attribute for each token of the sequence of tokens comprises:
comparing the brand name token with a normalization dictionary to determine a standardized representation of the brand name, wherein the standardized representations comprise the standardized representation; and writing the standardized representation of the brand name to a database entry associated with the product.

12. The method of claim 9 further comprising:
comparing the brand name token to a blacklist database; and
changing a label of the first token when the brand name token is part of the blacklist database; wherein:
the blacklist database comprises tokens that have been determined to not be the brand name.

13. The method of claim 11 further comprising:
gathering each unique standardized representation of the brand name;
determining a correctness of each unique standardized representation of the brand name; and
when the standardized representation of the brand name is not correct, creating an entry in the normalization dictionary to reflect a correct standardized representation of the brand name.

14. The method of claim 9, wherein:
receiving the title for the product further comprises receiving the title from a training set of titles; and
the method further comprises creating the training set of titles, wherein the training set of titles comprises titles with identified brand names.

15. The method of claim 9, wherein:
the sequence labeling model is chosen from a structured perceptron algorithm or a conditional random fields algorithm.

16. The method of claim 9, wherein:
determining the type of each token of the sequence of tokens comprises:
  storing the first token of the sequence of tokens associated with the label B of the BIO encoding scheme as a beginning of a brand name token;
  concatenating to the brand name token of each subsequent token of the sequence of tokens that is associated with the label I of the BIO encoding scheme;
comparing the brand name token to a blacklist database;
changing a label of the first token when the brand name token is part of the blacklist database; wherein:
the blacklist database comprises tokens that have been determined to not be the brand name;
gathering each unique standardized representation of the brand name;
determining a correctness of each unique standardized representation of the brand name; and
when the standardized representation of the brand name is not correct, creating an entry in the normalization dictionary to reflect a correct standardized representation of the brand name, wherein the standardized representations comprise the standardized representation; and further wherein
normalizing the attribute for each token of the sequence of tokens to create the standardized representations of the attribute for each token of the sequence of tokens further comprises:
comparing the brand name token with a normalization dictionary to determine the standardized representation of the brand name;
writing the standardized representation of the brand name to a database entry associated with the product;
gathering each unique standardized representation of the brand name;
determining the correctness of each unique standardized representation of the brand name; and
when the standardized representation of the brand name is not correct, creating an entry in the normalization dictionary to reflect the correct standardized representation of the brand name.

\* \* \* \* \*